United States Patent [19]
Kaczeus, Sr. et al.

[11] Patent Number: 6,154,360
[45] Date of Patent: Nov. 28, 2000

[54] HIGH IMPACT-RESISTANT DATA STORAGE SUBSYSTEM

[75] Inventors: Steven L. Kaczeus, Sr., San Jose; Steven L. Kaczeus, Jr., Hollister; Timothy Kim, San Jose, all of Calif.

[73] Assignee: DataZone Corporation, San Jose, Calif.

[21] Appl. No.: 09/160,640

[22] Filed: Sep. 24, 1998

[51] Int. Cl.[7] ........................................ G06F 1/16

[52] U.S. Cl. .................... 361/685; 361/687; 360/137; 312/633; 312/638; 312/636; 369/80; 369/77.2

[58] Field of Search ..................... 361/685, 687; 312/332.1, 333; 248/633, 634, 618, 638, 636; 364/708.1; 369/75.1, 75.2, 76, 77.1, 77.2, 78, 79, 80, 81, 82; 360/137, 137 D, 97.01, 98.01

[56] References Cited

U.S. PATENT DOCUMENTS

| | | | |
|---|---|---|---|
| 3,384,221 | 5/1968 | Houtman | 361/685 |
| 5,510,954 | 4/1996 | Wyler | 361/687 |
| 5,837,934 | 11/1998 | Valavanis et al. | 361/685 |
| 5,995,365 | 11/1999 | Broder et al. | 361/685 |

*Primary Examiner*—Leo P. Picard
*Assistant Examiner*—Lisa Lea-Edmonds
*Attorney, Agent, or Firm*—James E. Eakin; Mcdermott, Will & Emery

[57] ABSTRACT

A data storage subsystem capable of withstanding substantial non-operating shocks and other rough handling includes a pads configured to mate to a portion of the periphery of a data storage device to provide impact energy absorption and well as noise reduction and thermal dissipation. A flex circuit connects the data storage device to a connection, and includes a plurality of slits to permit the flex circuit to have flexibility in two dimensions.

7 Claims, 5 Drawing Sheets

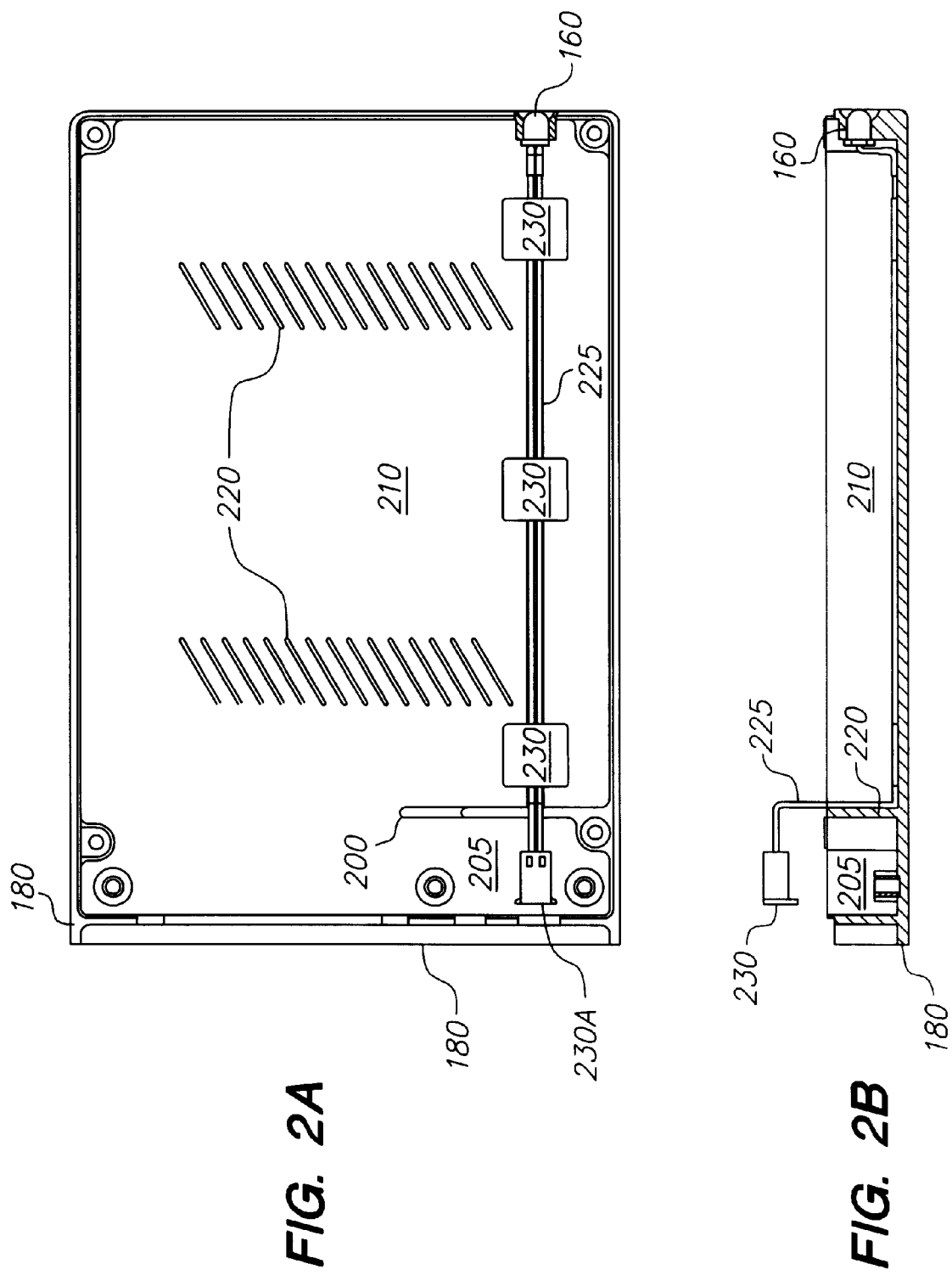

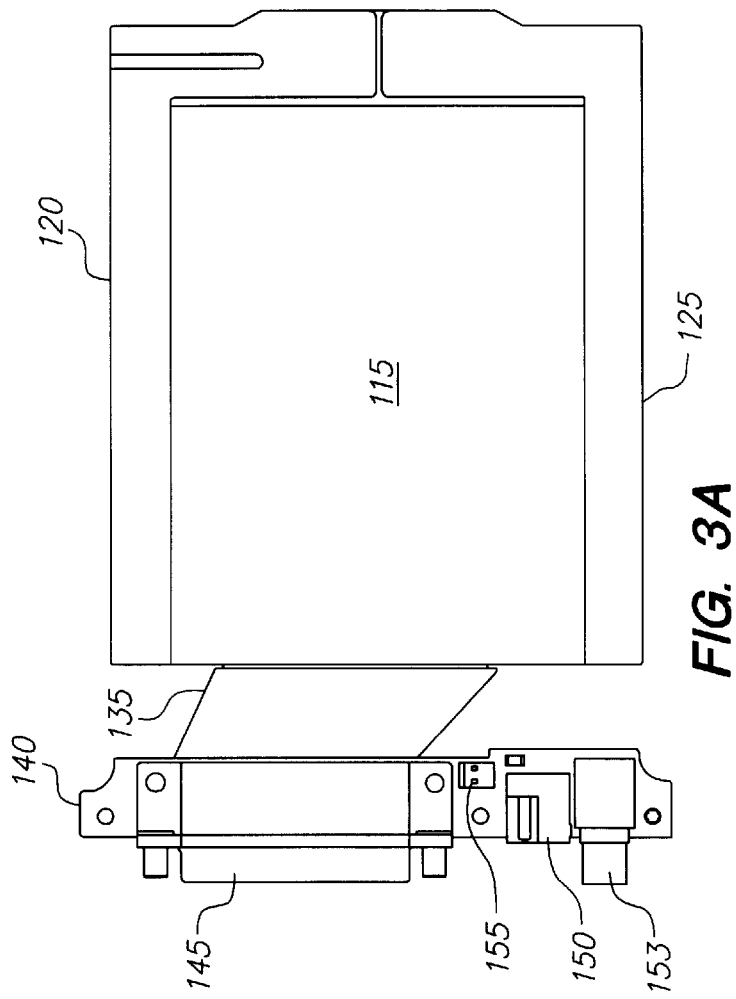
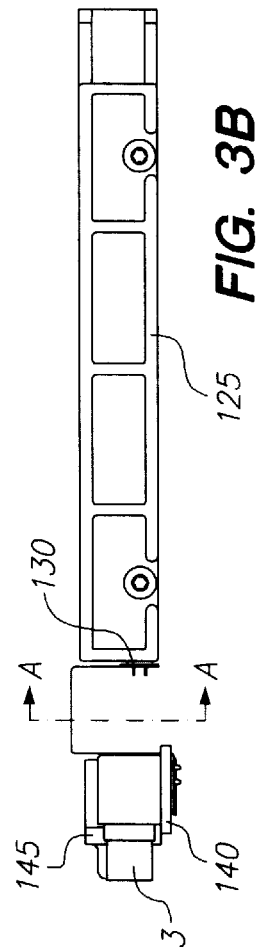
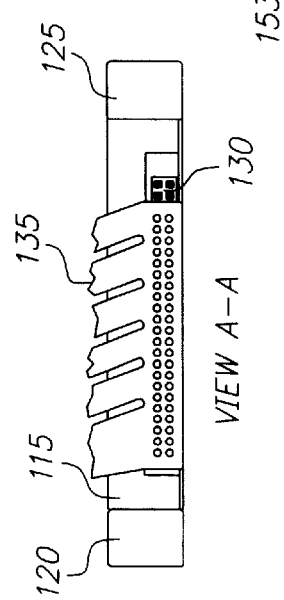
FIG. 3A
FIG. 3B
FIG. 3C

HIGH IMPACT-RESISTANT DATA STORAGE SUBSYSTEM

FIELD OF THE INVENTION

The present invention relates to methods and apparatus for high impact resistant peripherals for computers. In particular, the invention relates to methods and apparatus for providing high impact resistance for disk drive subsystems for personal computers and workstations.

BACKGROUND OF THE INVENTION

In most data recording and retrieval operations today, a Winchester type of magnetic head technology is used which traces its beginnings to a design developed by IBM Corporation in the early 1970's. Although there have been numerous variations and improvements over the intervening years, the fundamental design has included a spring loaded head-flexure mechanism maintained at a substantially constant distance, or flying height, from a rotating magnetic media.

Although the Winchester disk drive has become ubiquitous in the computing environment, a major limitation of such disk drives has been their general lack of portability. One of the major limitations on portability has been the limited shock resistance available with conventional designs. Most portability issues deal with shock during power-down, or while power is removed.

In nearly all current designs for Winchester disk drives, shock resistance is a major design consideration. Despite such efforts, shocks imparted to a drive as the result of being dropped, hit, jiggled, or by other movement are known to cause serious damage to the drive. Many design efforts have been attempted to reduce problems with shock, and substantial strides have been made compared to the extremely fragile designs of a few years ago. Auto-parking designs have been developed to position the heads in a "safe" location when power is turned off, but this alone does not always prevent damage when a drive is dropped. Head latches have been developed to work with auto-parking to fixedly position the heads in a safe location during powerdown, and this has allowed shock resistance to be improved significantly.

However, head latch implementations normally represent a tradeoff between between the amount of power which can be supplied to release the heads during power-up, and the number of G's shock resistance provided by the head latch to prevent the heads from sliding across and scoring the media. As a result, head latches have proven insufficient to provide the kind of significant shock or impact protection required to allow an external drive subsystem to survive the hazards of day-today operation in a home or office environment.

One measure of the limits of current impact resistant designs is that virtually no current drive design for general commercial use provides shock resistance capable of withstanding a thirty inch fall onto a concrete floor—an all-too-common occurrence in everyday life.

Another approach to impact resistance has been the removable media drive. Removable media drives such as those produced by Iomega and SyQuest have attempted to solve shock problems in a portable environment by simply arranging for the removal of the media during power-off. In these designs, a fixed head stack remains in a housing, while the media cartridge is removed. This allows for both shock resistance—because there are no heads in the cartridge to cause damage should the cartridge be dropped, and for enhanced capacity by swapping cartridges. While this has a number of initially attractive aspects, the lack of a sealed environment has created serious limitations for removable media drives which impact their ability to provide a long term solution. More specifically, a typical cartridge design is required to be exposed—at least some of the time—to the ambient environment, which is typically dust-laden or—even worse, rich in propellants and pollutants from hair or other sprays. The deposition of any such materials—even in relatively minute quantities from the perspective of the user—on the media of a removable cartridge has been known to lead to disastrous results including loss of data or complete failure of the cartridge and drive. Moreover, the lack of a protected environment limits the data density possible on removable cartridges, in turn leading to a relatively poor price/performance ratio. The difficulties with removable cartridge drives are compounded by the continuing cost reductions in the conventional disk drive industry.

As a result, there has been a need for a disk drive subsystem which can offer the portability as good or better than a removable cartridge drive, while at the same time offering the data density and other advantages of a fixed disk system.

SUMMARY OF THE INVENTION

The present invention substantially overcomes many of the limitations of prior art disk drive subsystems. In an exemplary embodiment described in greater detail hereinafter, a subsystem is configured to withstand the rough handling and shocks required of a portable device, including shocks on the order of 10,000 G's such as might be encountered in a thirty inch fall onto a concrete floor, while at the same time providing proper heat dissipation.

As an additional benefit, some configurations of the invention may be provided with significant acoustic damping such that the noise level of the operational drive is low for a commercial product.

The disk drive subsystem of the present invention includes a conventional disk drive, typically in either a 2.5 inch form factor or a 3.0 inch form factor, partly surrounded by a specially configured foam enclosure. The foam enclosure is typically encased within a shock resistant housing. An external connector is typically provided for a cable connection to a host system, with the external connector rigidly affixed to a printed circuit board.

To facilitate the exceptional shock resistance of the present invention, a flexible cable connection is provided internally to connect the disk drive or other core component to the printed circuit board. In particular, the flex circuit allows both vertical and lateral movement of the drive or other core component relative to the printed circuit board.

To permit the data storage subsystem of the present invention to interface with a host system, the subsystem is cable connected to the host through an external cable. The external cable may be connected to the host through any of a variety of means, including a PCMCIA card and its associated bus, a parallel port, a SCSI port, or a universal serial bus, to name only a few of the acceptable host interfaces.

The data storage subsystem of the present invention may be better appreciated from the following specification, taken in combination with the Figures described below.

BRIEF DESCRIPTION OF THE DRAWINGS

FIGS. 2A and 2B show in plan view and cross-sectional side view the lower housing of the data storage subsystem of FIG. 1.

FIGS. 3A, 3B and 3C show in top plan, side and cross-sectional end views the brackets, flex circuit and printed circuit board subassembly of the subsystem of FIG. 1.

DETAILED DESCRIPTION

Figure 1:
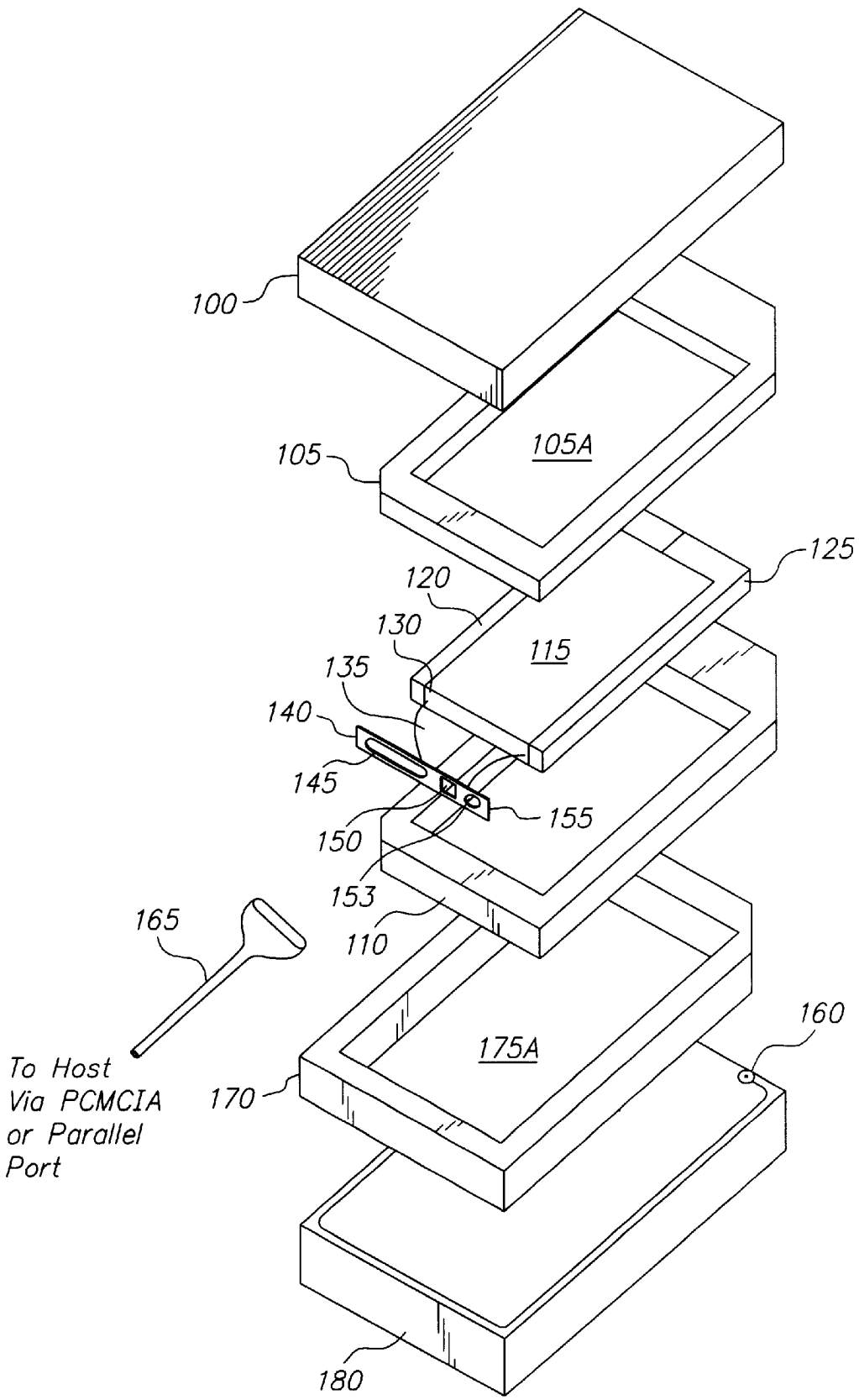
FIG. 1 is an exploded perspective view of a data storage subsystem according to the present invention.

Referring first to FIG. 1, the data storage subsystem 10 of the present invention can be seen in exploded perspective view. An upper housing or chassis 100 can be seen to be disposed above an upper pad 105, typically a foam material. The upper pad 105 is positioned over a middle pad 110, also typically comprised of foam and discussed in greater detail hereinafter in connection with FIGS. 3A and 3B. Both upper pad 105 and middle pad 110 can be seen to include interior openings or cavities 105A and 110A respectively therethrough, although the opening in the middle pad 110 can be seen to be slightly larger than the opening in the upper pad 105.

Positioned within the opening in the middle pad 110 is a disk drive 115, which may be fixedly connected to right and left brackets 120 and 125, respectively. The disk drive 115 may alternatively be any form of data storage device requiring significant protection from shock, rough handling or other physical abuse, but for exemplary purposes will be assumed to be a conventional 2.5 inch form factor disk drive such as those available from a variety of manufacturers including Toshiba, IBM and others. Alternatively, the disk drive or other data storage device may be of any acceptable form factor, in which case the housing and pads will be resized to accommodate the selected data storage device. For example, the disk drive 115 may be a three-inch form factor, in which case the left and right brackets 120 and 125 are not needed. It will be appreciated from the foregoing that the brackets 120 and 125 are provided only to permit flexibility in selecting from among available data storage devices, and serve only to match the cavity in the middle pad 110 to the size of the data storage device 115. As a result, brackets 120 and 125 are not needed in many embodiments of the present invention. Where used, the combination of the disk drive 115 and the associated brackets 120 and 125 may be considered a disk drive assembly 115A.

Connected to the back of the disk drive 115, by means of a connector 130, is a conventional flex circuit 135 which provides power and signal communication to a printed circuit board 140. The printed circuit board 140 has fixedly connected thereto a cable connector 145 for connection to a host and a power connector 150 for supplying power to the drive in the event sufficient power is not available through the cable connection. A start/stop switch 153 may also be provided in at least some embodiments. A connector 155 may also be provided on the printed circuit board 140 to supply power to an activity light 160, typically an LED used for indicating activity by the drive 115. A cable 165 typically connects between the cable connector 145 and a host system. In an exemplary embodiment, alternative cable connections may be provided whereby the cable 165 may connect to a PCMCIA card if such a connection is supported by the host (not shown) or may connect to a parallel port on the host if PCMCIA or Card Bus support is not available. If PCMCIA support is available, power may be provided therethrough and no other power supply is needed. However, if a parallel port connection is used, an external power supply is typically required. In other embodiments, the subsystem 10 may be connected to a host via a Universal Serial Bus, SCSI port, optical fiber, or other suitable connection. In this manner the subsystem of the present invention may be connected to PC's, workstations, gaming consoles, televisions including Web TV's, digital cameras and other devices.

Positioned below the disk drive 115 and middle pad 110 is a lower pad 175, typically of the same form as the upper pad 105, including a cavity 175A extending through its center. As will be appreciated from FIG. 1 and more especially from FIGS. 7A–7B, discussed hereinafter, the cavities in the upper and lower pads are configured to be slightly smaller than the cavity in the middle pad 110, such that the upper and lower pads support the top and bottom surfaces of the disk drive assembly 115A. It will be appreciated that the cavities 110A and 175A in the upper and lower pad permit significant ambient air to circulate around the drive 115, thereby preventing the drive from reaching unnecessarily elevated temperatures. A lower housing or chassis 180 is provided which is complementary to the upper housing 100 and, together with the upper housing 100, sandwiches the entire remainder of the assembly to form a completed subassembly. The upper and lower housings may be affixed to one another by any suitable means, including screws, clips, a combination thereof, or other fastening devices (not shown.) Feet 190 may be provided and, in at least some embodiments are magnetic to permit the subassembly to be affixed to a host system (not shown).

As used herein, the terms "vertical", "upward" and "downward" are relative terms, taken in the context of the orientation of the drawings. It will be appreciated that disk drives may be placed in a number of vertical or horizontal orientations, and so these terms are to be understood in context.

One significant advantage of the present invention is its ability to protect the data storage device 115 contained therein. In an exemplary embodiment, the housings 100 and 180 are constructed of Lexan or other high impact plastic. The upper, middle and lower pads 105, 110 and 175 are typically formed foam such as polyurethane foam and, in conjunction with the housings, provide protection against non-operating shocks on the order of 10,000 G's. Such shock protection is adequate to permit the subassembly to sustain a 30 inch fall onto a concrete floor without damage to a disk drive contained within the subassembly. A typical desk is approximately thirty inches in height, and thus a thirty inch fall is representative of a typical drop. In an exemplary embodiment, the foam may be 70120 polyurethane foam with a density of 1.2 pounds per cubic foot.

Referring next to FIGS. 2A and 2B, the lower housing 180 may be better appreciated. The lower housing 180 may be seen to include an interior wall 200 which partially separates the interior of the housing into cavities 205 and 210. The larger cavity shown at the right in FIGS. 2A–2B, which receives the pads and drive, may be seen to include centrally located vents 220 for cooling. A cable 225 can be seen to extend from the LED 160 to a female connector 230A to plug into the connector 155 on the printed circuit board shown in FIG. 1. The cable 225 may be held in place by means of tape, glue, or other attachment methods as shown at 230.

Referring next to FIGS. 3A–3C, the bracket, flex circuit and printed circuit board arrangement may be better appreciated. FIG. 3A shows a top plan view of these elements, while FIG. 3B shows a side view and FIG. 3C shows a cross-sectional side view taken along the line A—A in FIG. 3B. The disk drive 115 is affixed to a left bracket 120 and a right bracket 125 by means of screws 300, and the flex circuit 135 couples to the disk drive 115 by means of a conventional high density IDE connector 130. The power supply connection 150 can be seen as well as the cable connector 145 and the connector 155 to which the cable 200 is coupled. The start/stop switch 153 can also be seen, although it is not required in all embodiments.

Figure 4:
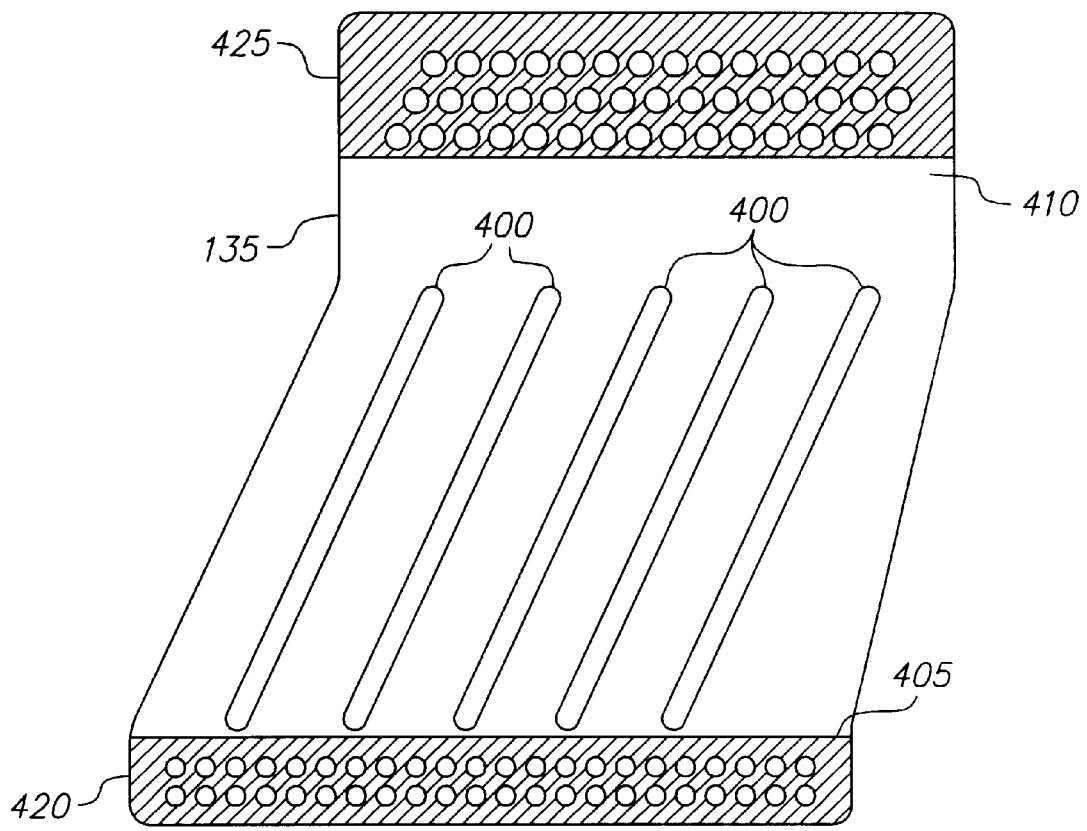
FIG. 4 shows the flex circuit of the subsystem of FIG. 1.

Next with reference to FIG. 4, the flex circuit 135 may be better appreciated. While conventional flex circuits typically provide little lateral flexibility, the shock absorption requirements of the present invention make such rigidity unacceptable. Instead, a plurality of slits 400 are provided in the thin film of which the flex circuit 135 is comprised, with the slits 400 extending substantially along length of the thin film material from the connecting portion 405 to which the connector 130 is affixed to the connecting portion 410 which is soldered or otherwise permanently affixed to the printed circuit board 135. Stiffeners 420 and 425, indicated by the cross-hatching shown in FIG. 4, may be provided at the connecting portions 405 and 410. The configuration permits flexibility in two dimensions instead of the single dimension flexibility characteristic of the prior art.

Figures 5A, 5B:
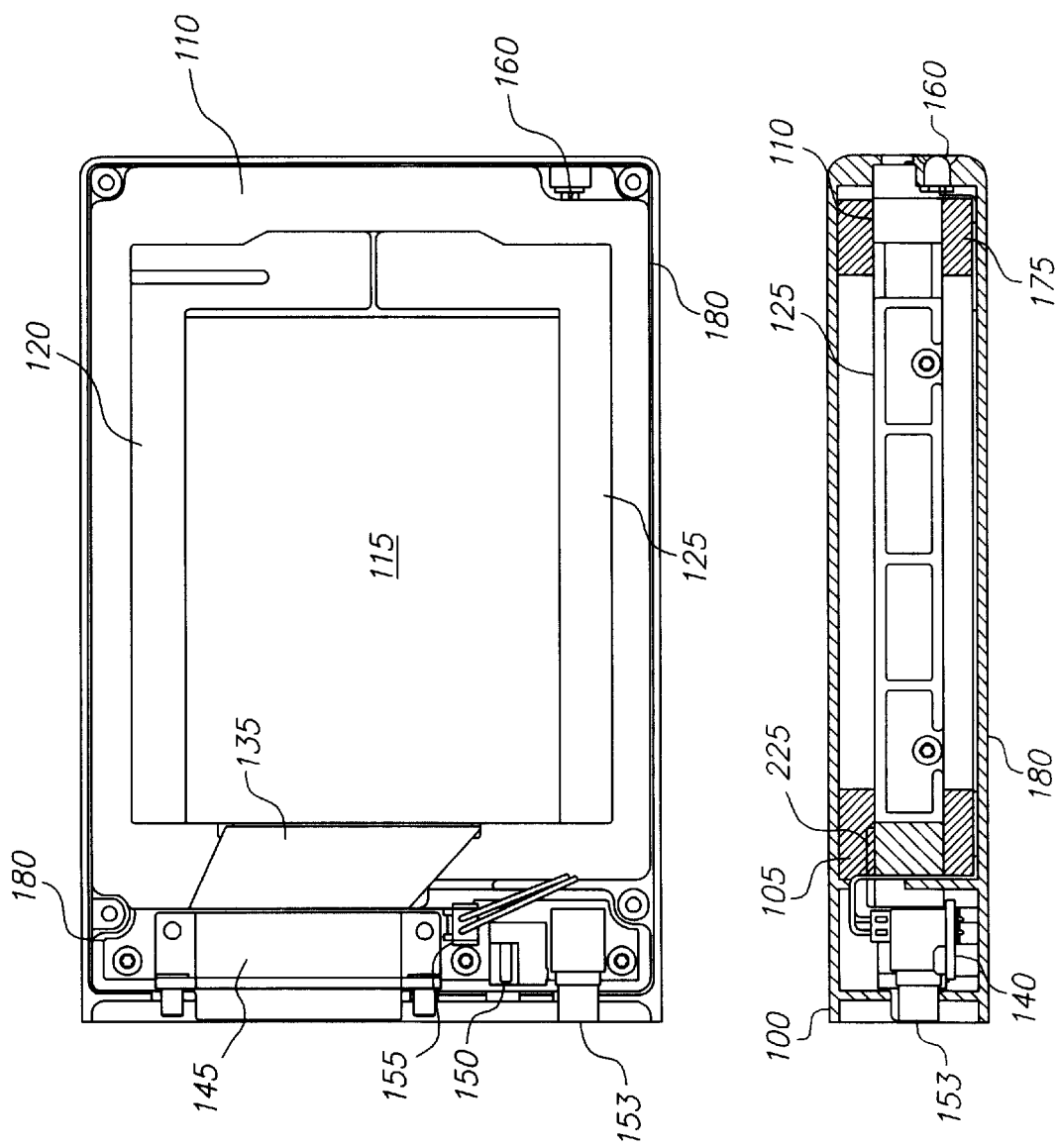
FIGS. 5A–5B show top plan and cross-sectional side views, respectively, of the subsystem of FIG. 1.

The assembled disk drive may be seen in top plan and cross-sectional side view in FIGS. 5A and 5B, and in particular the arrangement of the upper, middle and lower pads 105, 110 and 175, respectively, may be seen in cooperation with the disk drive or other data storage device 115. In particular, the upper and lower pads 105 and 175 may be seen extending beyond the middle pad 110 so that the outer periphery of the disk drive 115 is supported, above and below, by the pads 105 and 175. Laterally, the disk drive is constrained by the middle pad 110. By virtue of such impact energy constraints, the shock absorption capabilities of the foam, in combination with the shock absorption capacity of the data storage unit itself and the housing, have permitted data storage subsystems constructed in accordance with the present invention to withstand non-operating shocks on the order of 10,000 G's and thirty inch falls onto a concrete floor. Such performance has been generally unavailable in the commercial marketplace.

Figure 6:
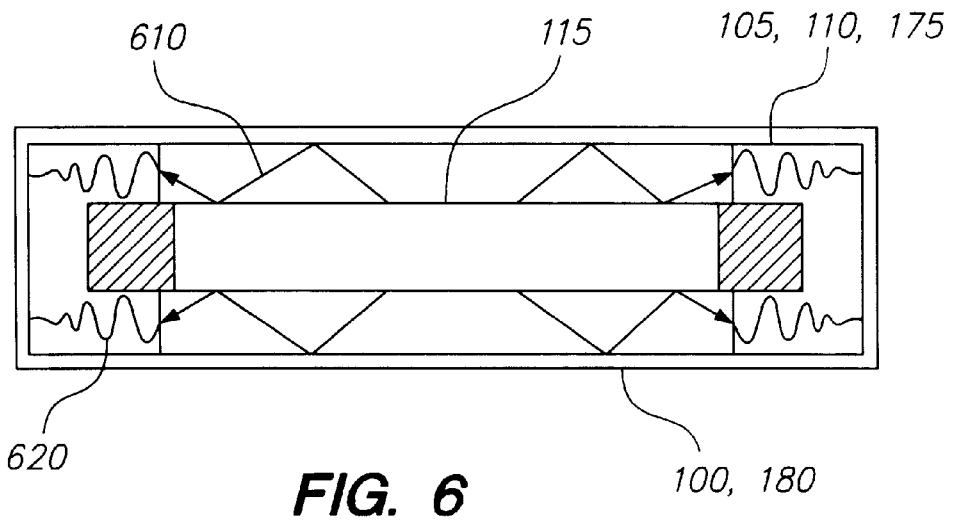
FIG. 6 shows an acoustic damping feature of the system.

The arrangement of the pads 105, 110 and 175 also provide additional features, including acoustic noise reduction and heat dissipation. By constructing the pads of foam such as 70120 polyurethane foam or other foam materials used in anechoic chambers, significant reduction of ambient noise levels may be reduced. By configuring the pads to contact the disk drive only at its periphery, or only on the brackets 120 and 125 if used, an air space is created above and below the drive to permit appropriate heat dissipation from the drive 115. Referring to FIG. 6, the acoustic damping feature 620 of the system may be better appreciated. As is shown in the drawing, sound 610 originating from the disk drive, is largely trapped within the upper and lower housing 100 and 180, and is significantly absorbed by the foam pads 105, 110 and 175. In addition to the high shock resistance, the construction of the present invention benefits its user by reducing the audible noise generated by the operational disk drive. It will again be appreciated that any form factor of disk drive or other data storage device may be used, with appropriate resizing of the housing, the pads and the associated cavities formed thereby, although not all such designs will be capable of withstanding the same magnitude of impact energy as the exemplary embodiment described above.

It can therefore be appreciated that a simple but effective design for a high impact resistant data storage subsystem has been described, which affords positive protection for the disk even in the event of angular shocks and other rough handling associated with portable devices. Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

What is claimed is:

1. A data storage subsystem capable of sustaining shocks comprising upper and lower housings, a middle pad having a cavity therethrough for receiving a data storage device, upper and lower pads, each having a cavity therethrough configured to support the upper and lower surfaces, respectively, of the data storage device, and a connection device for providing electrical communication between the subsystem and a host.

2. The data storage subsystem of claim 1 wherein the connection device includes a flexible thin-film portion having therein a plurality of conductors therein and a plurality of slits therethrough.

3. The data storage subsystem of claim 2 further wherein at least some of the upper, middle and lower pads are formed of acoustic dampening foam.

4. The data storage subsystem of claim 1 wherein the one or more of the pads are formed of acoustic dampening foam.

5. A data storage subsystem capable of sustaining shocks comprising upper and lower housings, a middle pad of shock absorbing foam having a cavity therethrough for receiving a data storage device, upper and lower pads of shock absorbing foam, each having a cavity therethrough configured to support the upper and lower surfaces, respectively, of the data storage device, and a connection device for providing electrical communication between the subsystem and a host.

6. The data storage device of claim 5 wherein the connection device connects to a host system through a PCMCIA port.

7. The data storage device of claim 5 wherein the connection device connects to a host system through a parallel port.

* * * * *